March 31, 1931. E. J. SERPAS 1,799,026
AUTOMATIC LUBRICATING DEVICE
Filed Aug. 7, 1929 6 Sheets-Sheet 1

Inventor
E. J. Serpas
By Wilkinson & Giusta
Attorneys

March 31, 1931.  E. J. SERPAS  1,799,026
AUTOMATIC LUBRICATING DEVICE
Filed Aug. 7, 1929  6 Sheets-Sheet 2
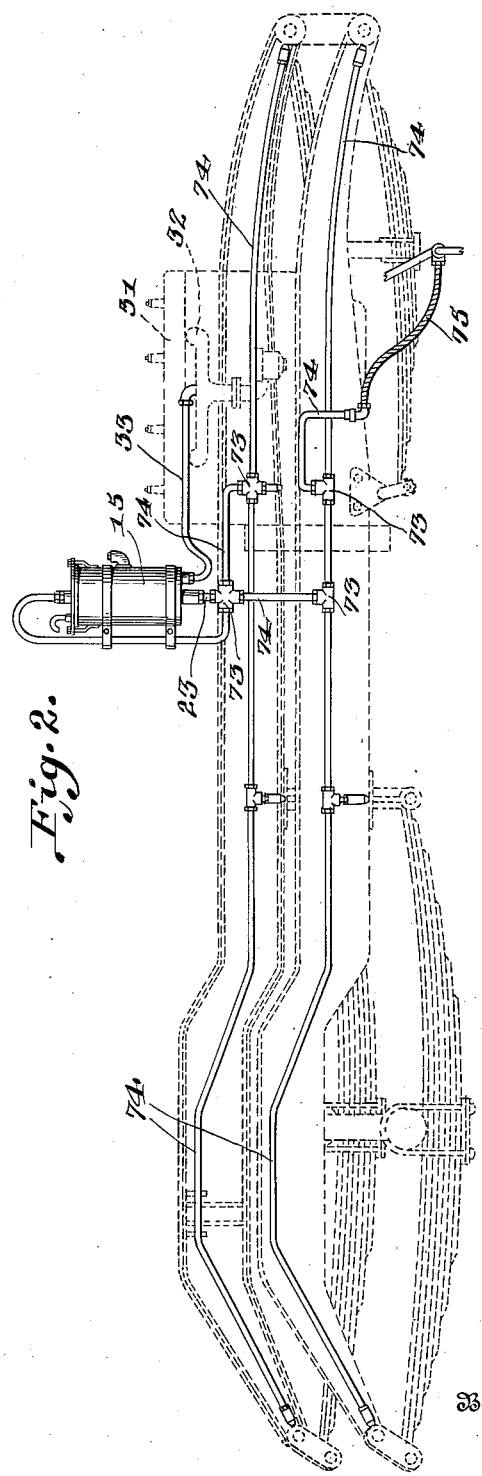

March 31, 1931. E. J. SERPAS 1,799,026

AUTOMATIC LUBRICATING DEVICE

Filed Aug. 7, 1929 6 Sheets-Sheet 3

Inventor

E. J. Serpas

By Wilkinson & Giusta

Attorneys

March 31, 1931.  E. J. SERPAS  1,799,026
AUTOMATIC LUBRICATING DEVICE
Filed Aug. 7, 1929  6 Sheets-Sheet 4
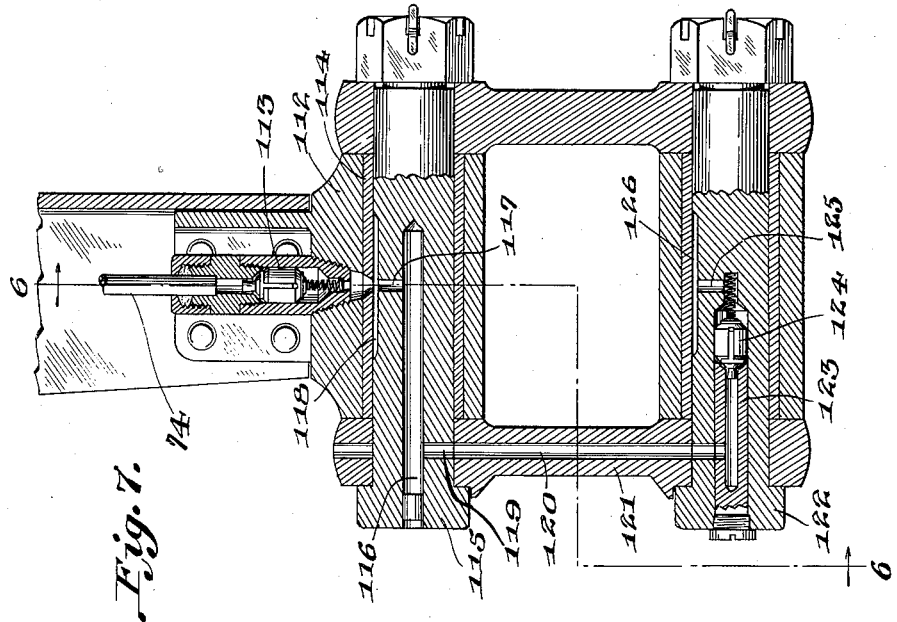
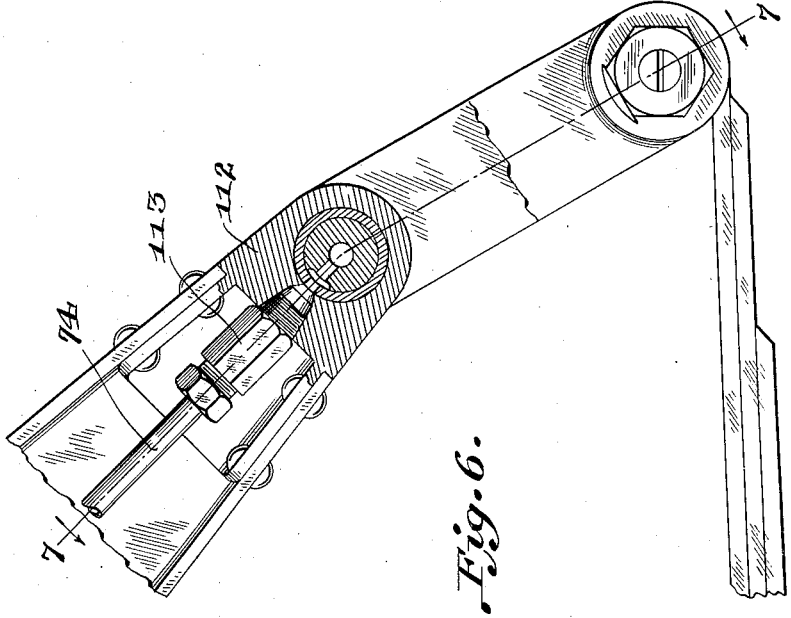
Inventor
E. J. Serpas
By Wilkinson & Giusta
Attorneys

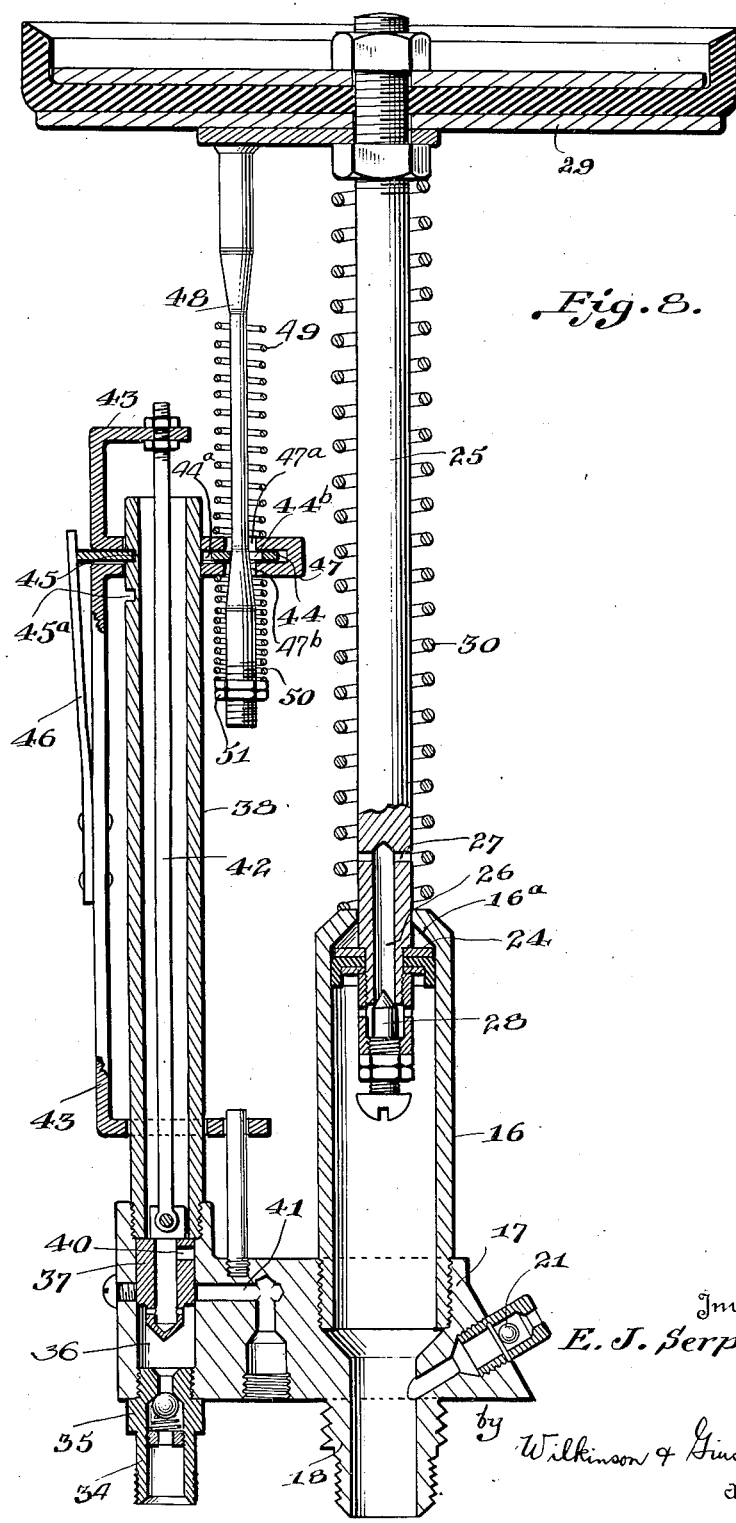

March 31, 1931.  E. J. SERPAS  1,799,026
AUTOMATIC LUBRICATING DEVICE
Filed Aug. 7, 1929  6 Sheets-Sheet 6

Inventor
E. J. Serpas
By Wilkinson & Giusta
Attorneys

Patented Mar. 31, 1931

1,799,026

UNITED STATES PATENT OFFICE

ERNEST J. SERPAS, OF NEW ORLEANS, LOUISIANA

AUTOMATIC LUBRICATING DEVICE

Application filed August 7, 1929. Serial No. 384,124.

The present invention relates to automatic lubricating devices, and more particularly to certain improvements over my prior United States Patents Nos. 1,677,992, granted July 24, 1928, and Re-issue 17,073 dated August 28, 1928, and my co-pending application Serial No. 326,889, filed December 18, 1928.

It is the aim of the present invention to provide for the adequate, automatic and dependable lubrication of all the shackle bolts and other various parts on a motor vehicle while the same is in motion and in operation, the lubricant being supplied at frequent intervals automatically to prevent the bearings running dry and becoming unduly worn and noisy.

Another object of the invention is to provide a simply constructed and positively accurate device for delivering measured quantities of lubricant periodically to a lubricating system.

A further object of the invention is the provision of a regulating means which will control the time desired to elapse between the period of operation.

A further object in a device of this kind is the provision of a pressure responsive means which acts during the period of operation to control the number of pressure strokes the device is to perform in order that a desired pressure may be built up in the system. A device of this kind is desirous in an automatic system which operates only at intervals due to the fact that the lubricant may leak out of the conduit or other parts of the system, and it will necessitate several strokes of the pump to build up a desired pressure, or the same case might apply to the system when first installed and needs priming; then again in other cases a single stroke may be sufficient.

A still further object of the invention is to provide in a system of this kind means for controlling the time in which the pressure is maintained in the system in order to permit the slow moving lubricant in zero weather ample time to move through a wide spread of small distributing tubes.

The invention also aims to provide a certain efficient means for lubricating the spindle pins, drag link, front axle, tie rod, and the swinging shackle bearings of a motor vehicle.

A further aim of the present invention is to utilize the energy from the suction created in the carburetor manifold of gas engines, or other mechanically operating machines, for forcing the lubricant through the system, the intention being that the device may be connected to the carburetor manifold by means of a tube whereby the elastic medium within the device may be evacuated, causing a pressure difference on the area of a sliding piston which will act to operate a pump and force the lubricant under pressure through one or more pipes to bearings on the vehicle or the like to be lubricated.

With the foregoing and other objects in view, the invention will be more fully described hereinafter, and will be more particularly pointed out in the claims appended hereto.

In the drawings, wherein like symbols refer to like or corresponding parts through the several views, Figure 1 is a vertical section taken through the controlling and feeding device of the present invention.

Figure 2 is a diagrammatic perspective view of a lubricating system embodying the features of the present invention and as applied to the chassis of an automobile.

Figure 3 is a detail longitudinal section through one of the novel discharge nozzles employed, the valve being in one position.

Figure 4 is a similar view showing the valve disposed in an opposite position.

Figure 6 is a detail enlarged view, partly in section of one of the rear shackle bearings of the chassis, taken substantially on the line 6—6 of Figure 7.

Figure 7 is a transverse section through the same substantially on the line 7—7 of Figure 6.

Figure 8 is a detail enlarged vertical section of the pump with its pistons and controlling valves.

Figure 1:
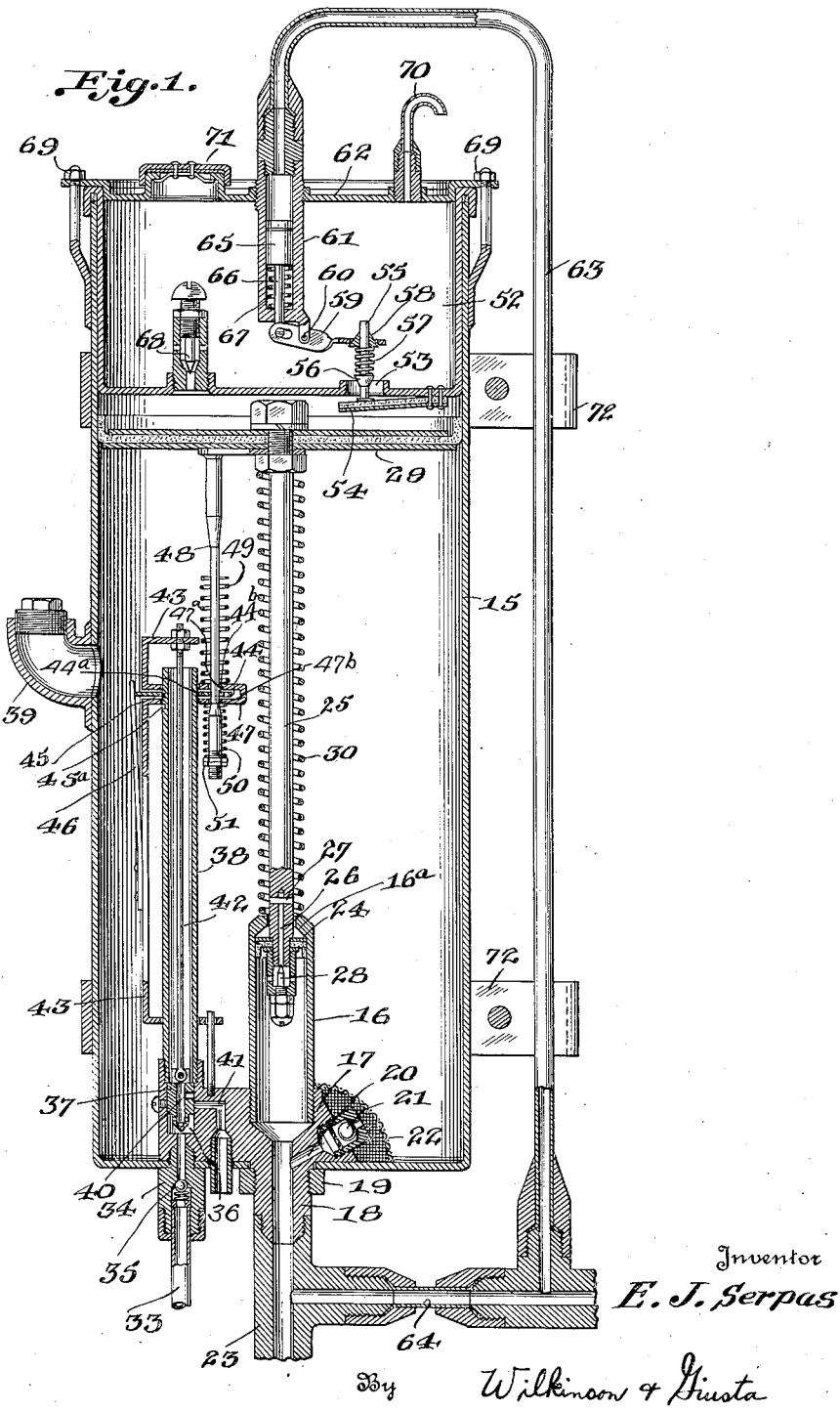

Referring now more particularly to the drawings, and first to Figures 1 to 4, inclusive, the controlling and feeding device comprises a cylinder 15 which is open at its upper end and closed at its lower end, and which is provided in its lower end and preferably axially of the cylinder with a lubricant pump casing 16.

The pump casing 16 is relatively small and is threaded at its lower end into a casting 17 which is fitted against the bottom of the cylinder 15 and is provided with a hollow projection 18 extending through the bottom of the cylinder 15 and communicating with the lower end of the pump casing 16. The casting 17 is held in place by a nut 19 which is threaded upon the lower end of the projection 18 and adapted to bind against the under side of the bottom of the cylinder 15. The casting 17 is provided in one side with a passage 20 controlled by a check valve 21 for admitting lubricant from the interior of the cylinder 15 to the pump casing 16. A protecting screen 22 is preferably mounted on the casting 17 and over the check valve 21 to prevent the entrance of foreign substances to the lubricating passage of the system.

The lower end of the hollow projection 18 is connected, by threads or otherwise, with a supply pipe 23 for distributing lubricant under pressure from the pump casing 16 to the various branches of the lubricating system.

Within the pump casing 16 is a small piston 24 snugly fitted to the casing and mounted on the lower end of a piston rod 25 which extends upwardly through the pump casing 16 and into the upper end portion of the cylinder 15. The lower end of the piston rod 25 is provided with an axial opening 26 leading through the piston 24. The said opening at its upper end communicates with one or more radial openings 27 in the piston rod 25 whereby communication is established through the piston 24 in order to return the excess lubricant from the pump back to the oil container.

The pump casing 16 is provided at its upper end with a shoulder 16a which acts as an abutment to prevent the piston 24 from being drawn or forced out of the pump casing.

The needle valve 28 is mounted on the lower end of the piston rod 25 for controlling the flow of lubricant through the passage 26. A large piston 29 is mounted on the upper end of the piston rod 25 and closely fits the inner wall of the cylinder 15 near the upper end thereof. A coil spring 30 is mounted about the piston rod 25 and bears at its lower end against the upper end of the pump casing 16 and at its upper end against the under side of the piston 29 to normally urge and hold the latter upwardly, in the position shown in Figure 1.

The piston 29 is adapted to be drawn downwardly at times for operating the small piston 24 in the pump casing 16, and this operation is effected by the suction in the manifold of the gas engine. As shown in Figure 2, an internal combustion engine is indicated in dotted lines at 31 and is provided with an intake manifold 32 to which is connected one end of a suction pipe 33, which leads to the lower end of the cylinder 15. As best shown in Figure 1, the pipe 33 is provided with a nipple 34 which is threaded through the bottom of the cylinder 15 and into the casting 17. The nipple 34 is provided with an upwardly seating spring press check valve 35 to prevent upflow of air into the cylinder 15.

The casting 17 is provided, in line with the nipple 34, with a valve casing 36, comprising merely a bore or recess in the casting 17 and in which is slidably mounted a valve 37. The valve 37 is of tubular construction, is provided with a conical closed lower end and lateral ports above said closed end for establishing communication upwardly through the valve 37 from the pipe 33 when the valve 37 is raised into open position. The casting 17 also carries a vertically disposed tube 38 which is secured at its lower end in the valve casing 36 above the slide valve 37 and communicates with the latter through the upper open end of the slide valve, the tube 38 terminating at its upper open end intermediate the height of the cylinder 15 so as to be disposed in suitably spaced relation beneath the piston 29.

The cylinder 15 is provided at one side with a filler neck 39 which is disposed with its lower portion below the upper end of the tube 38 and through which any oil or grease is adapted to be poured for filling the lower portion of the cylinder 15. The particular location of the filler neck 39 is to prevent the overfilling of the cylinder 15 to a height above the tube 38 in order to prevent an excess quantity of lubricant from being drawn into the motor.

The suction evacuates the upper portion of the cylinder 15 beneath the piston 29 and draws the latter downwardly against the tension of the spring 30. The valve 37 is adapted to close the suction pipe 33 to the tube 38 as the piston 29 reaches the lower end of its stroke and to also open the cylinder 15 beneath the piston 29 to the atmosphere. This is accomplished by providing the valve 37 at one side with a port 40 which, when the valve 37 is lowered, registers with a vent passage 41 formed in the casting 17 and which opens downwardly through the bottom of the cylinder 15.

The valve 37 is connected at its upper end to a valve rod 42 which extends upwardly through the tube 38 and which is secured at its upper end to a slide bracket 43. The slide bracket 43 may be of any suitable construction and is shown in the present instance as comprising a vertically disposed bar having laterally bent arms at opposite ends one of which overhangs the upper end of the tube 38 and is attached to the valve rod 42 while the lower arm is apertured and adapted to slide freely upon the tube 38 for guiding and supporting the slide bracket 43.

The slide bracket 43 is also provided near its upper end with a third laterally extending arm which is apertured and slidably engages over the upper end portion of the tube 38 for supporting and guiding the bracket 43 and also for supporting a yieldable dog 44 in the form of a flat plate having an elongated aperture 44a intermediate its ends and engaging over the tube 38. One edge portion of the dog 44, at its inner margin, is provided with rounded surfaces adapted to engage in spaced notches 45 and 45a formed in the outer side of the tube 38. The dog 44 is yieldably held in engagement with the adjacent notch by a spring 46 carried upon the bracket 43 and engaging the dog 44.

The means for shifting the slide bracket 43 comprises a stem or rod 48 having opposed tapered portions terminating in larger ends, while the intermediate portion is comparatively small. The rod is secured to the under side of the piston 29 and extends downwardly and slidably through the apertures 47a and 47b in the hollow arm 47 and through a suitably formed opening 44b in the dog 44 arranged in the arm. The rod 48 is provided with a coil spring 49 disposed above the arm 47 and slidably arranged about the rod, and a second spring 50 mounted on the rod 48 in the same manner below the arm 47. The rod 48 is provided upon its lower end with a nut or the like locking means 51 for holding the spring 50 on the rod.

When the springs 49 and 50 are alternately compressed to a certain efficient pressure upon the opposite sides of the arm 47, one side at a time, and the piston reaching the extremity of its travel, the tapered portions of rod 48 extend sufficiently through the apertures 47a and 47b in the arm 47 to bring the aperture 44b in the dog 44 in alignment with both apertures 47a and 47b with the result that the dog 44 is forced out against the tension of the spring 46 and out of engagement with the slot 45, or 45a as the case may be.

Assuming the piston traveling upward, or on its returning stroke, and reaching a point near the extremity of its travel; the lower wedge portion of the rod 48 is then sufficiently advanced in the openings 47b and 47a in the arm 47 to align with the opening 44b in the outer end of the dog 44. This action naturally shifts the elongated slot 44a and moves the edge of the dog 44 out of engagement with the lower notch 45a, the spring 50 being then compressed between the lower side of arm 47 and the lock nut 51 on the rod 48, is highly energized and suddenly shifts the sliding bracket 43 and the associated valve 37 upwardly and brings the dog 44 into engagement with the upper notch 45. The same action occurs on the down stroke of the piston but in a reverse manner.

For the purpose of controlling the speed of operation of the piston 29, a liquid carrying cup 52 is fitted in the upper end of the cylinder 15 and is adapted to contain oil or other suitable liquid. The bottom of the cup 52 is provided with an opening 53 which is controlled by a flap valve 54 secured to the under side of the cup 52 and adapted to open downwardly by suction created upon the downward movement of the piston 29.

It is desirable at times to hold the flap valve 54 downwardly or in open position, as shown in Figure 1. For this purpose the valve 54 is provided with an upwardly extending stem 55 having a shoulder 56 near its lower end and against which bears a spring 57 which is mounted on the stem 55. Slidably mounted on the upper end of the stem 55 is a conically shaped sleeve which is supported by the spring 57 and shown at 58. The sleeve 58 is adapted to be urged downwardly by one end of a lever 59 which is apertured and engages over the conical sleeve 58. The lever 59 is pivotally mounted at 60 upon the lower end of a cylindrical bracket 61 which is secured through a detachable cover plate 62 and is connected at its upper end by a pipe 63 to branch pipe 64 which leads from the main supply pipe 23. The cylindrical bracket 61 is provided therein with a snugly fitted plunger 65 which is connected by a stem 66 to the opposite end of the lever 59 and which is normally urged into upward position, as shown in Figure 1, by a spring 67, located in the lower end of the cylindrical bracket 61 and bearing against the under side of the plunger 65.

The cup 52 is adapted to contain liquid which when the piston 29 is moved downwardly flows freely through the opening 53 into the space between the bottom of the cup 52 and the piston 29. When the piston 29 is raised by the spring 30, and the valve 54 is held open by the stem 55, the liquid is adapted to flow back into the cup 52 through the opening 53 without any appreciable resistance. When pressure in the supply pipe 23 becomes abnormal, such pressure is communicated back through the pipe 63 against the plunger 65 to force the latter downwardly against the spring 67 and shift the lever 59 so that the stem 55 is released of the pressure of the spring 57 and the flap valve 54 may close. Upon the return of the piston 29 to upper position the flap valve 54 prevents the liquid from flowing back through the opening 53 and consequently the piston 29 is checked in its upward movement. Upon this occurrence a pressure is built up under the valve 54 which breaks down the resistance of spring 57 permitting the valve to remain closed while the piston slowly returns. To prevent the interlocking of the parts, however, the liquid cup 52 is provided in its bottom with a regulating valve 68 of preferably the needle type and which opens through the bottom of the cup 52 so that the needle of the valve 68 may be adjusted to admit of the return flow of the liquid into the cup 52 at the desired rate, whereby the upper movement of the piston 29 is therefore checked or regulated.

To prevent a hydraulic lock in the pump cylinder 16 the lubricant is permitted to flow outwardly therefrom past the small piston 24 through the needle valve 28 and the openings 26 and 27 in the lower end of the piston 25. It will be apparent from the above description that the time interval in which the pressure is permitted to exist in the pump cylinder and associated tubes throughout the system may be regulated through the adjustment of the needle valve 28 controlling the return passage from the pump back to the cylinder 15. The excess lubricant is thus permitted to return to the lower end of the cylinder 15 after passing through the pump 16.

The cover plate 62 may be clamped in position upon the upper end of the cylinder 15 by nuts 69 or the like. The cover plate 62 is also provided with a vent tube 70 to communicate the upper portion of the cup 52 with the atmosphere, and is also provided with a filler cap 71 through which liquid may be supplied to the cup 52. It will be noted that the filler cap 71 is in register with the needle valve 68 so that the latter may be quickly and easily adjusted by a screw driver or the like for controlling the return movement of the piston 29 and thus regulate the time desired to elapse between the periods of operation of the pump 16. The cylinder 15 may be provided with brackets 72 or the like for mounting the cylinder at any desirable point upon the chassis or body of the motor vehicle to which this system is applied.

As shown in Figure 2, the supply pipe 23 may be provided with a branch coupling 73 from which extend branches 74 which in turn may have other branch coupling and subbranches so as to complete the system and lead the pipes and branches thereof to the different bearings 45 of the chassis which are to be lubricated.

At or adjacent to each bearing the branch supply pipe 74 is provided with a controlling or metering valve, such as shown in Figures 3 and 4 particularly. Each valve comprises a cylindrical casing 76 having a reduced externally threaded neck portion 77 shaped to receive the end of the branch pipe 74 and to carry a compression coupling 78 adapted to secure the pipe to the neck portion 77. The casing 76 has a relatively large cylindrical bore while the neck 77 has a reduced bore in axial alignment with the bore in the casing 76 and the grease or other lubricant is adapted to be fed from the pipe 74 into the neck 77 and into the casing 76. The casing 76 is provided with a piston 79 which is of less length than that of the casing 76 and is adapted to reciprocate therein. The piston 79 is provided at one end with an outwardly flaring plug 80 adapted to fit somewhat snugly in the opening in the neck 77 and against which the lubricant is adapted to be fed, while the opposite end is provided with a seat for sealing the latter at that point on the pressure stroke.

The outer end of the plug 80, remote from the pipe 74, is provided with an enlarged disc valve 81 adapted to engage a conical seat 82 at the inner end of the casing 76 to close the latter to the pipe 74, as shown in Figure 3. It will be noted that the valve 81 and the plug 80 are formed as an integral structure, and that the valve 81 is provided with a tail piece 83 adapted to slidably fit in the rear end of the piston 79. The forward end of a coil spring 84 fits at its forward end in a removable hollow plug or nut 85 through which the lubricant is finally ejected into the bearings. The spring 84 is adapted to normally urge the piston 79 backwardly into the position shown in Figure 3. The piston 79 is provided longitudinally in one side with a slot or groove 86 extending from end to end of the piston 79 and through which the lubricant is adapted to pass as it is transferred from the rear end of the piston to the forward end thereof during the reciprocating movements of the piston. The groove or slot 86 is provided with a check valve of any suitable construction, but which may be in the form of a leaf spring 87 provided with a ring-shaped base 88 encircling the tail piece 83 and clamped thereon between the disc valve 81 and the rear end of the piston 79. It is to be noted that the leaf spring 87 is bent at less than a right angle to the ring portion 88 so that the free end of the leaf spring 87 bears against the inner wall of the casing 76 and the spring extends at an inclination outwardly in the slot 86 to normally close the same.

The pressure of lubricant against the upper side of the spring 87 is adapted to depress the spring 87 downwardly sufficiently to permit the lubricant to pass forwardly through the slot 86 and upon the return movement of the piston 79 the lubricant is adapted to engage the leaf spring 87 and thus hold the same in expanded or outward position, and prevent the backward flow of the lubricant through the passage 86.

The operation of this metering valve is thought to be understood from the above because as the lubricant under pressure from the pipes 74 engages against the rear end of the plug 80 it forces the plug forwardly which in turn forces the disc valve 81 into open position and moves the piston 79 forwardly so as to eject any lubricant which has been prior fed through the valve. As soon as the plug 80 escapes the neck portion 77, as shown in Figure 4, the lubricant under pressure from pipe 74 is free to escape into the space about the plug 80 and also about the disc valve 81 and throughout the length of the groove 86 and stopped at the seal of the forward seat so that a predetermined amount of the lubricant is admitted to the rear end of the cylinder 76. This occurs during the downward or pressure stroke of the main pump piston 29, and upon the return movement thereof the pressure is relaxed in the pipe 74 so that the spring 84 is permitted to operate and move the piston 79 rearwardly, first moving the plug 80 into the neck 77 to cut off the return flow of the grease from about the valve 81 into the pipe 74.

The spring 84 gradually moves the piston 79 rearwardly and the lubricant at the rear end of the piston 79 is transferred through the passage 86 to the forward end of the piston 79. The valve 81 is seated and the check valve 87 holds the lubricant at the forward end of the piston 79. Upon the next downward stroke of the main piston 29 the piston 79 is moved forwardly, as above explained, and the lubricant in front of the piston 79 is held by the check valve 87 and is forced to exude through the plug or nut 85 and into the bearing or the like.

As above explained, when the lubricating system is full of lubricant, or well primed, and the resistance offered by the lubricant to the downward movement of the piston 24, reaches a maximum predetermined pressure, the plunger 65 in the top of the controlling device is actuated so as to check the upward movement of the piston 29. The result of this action causes a pressure beneath the flap valve 54 and breaks down the resistance of the spring 57, holding the valve in a closed position and causing the liquid to find its way back through the regulating valve 68 which is adjustable to permit the liquid to return to the upper compartment at a desired rate whereby a desired time is permitted to elapse between the intervals of operation of the system.

Figure 5:
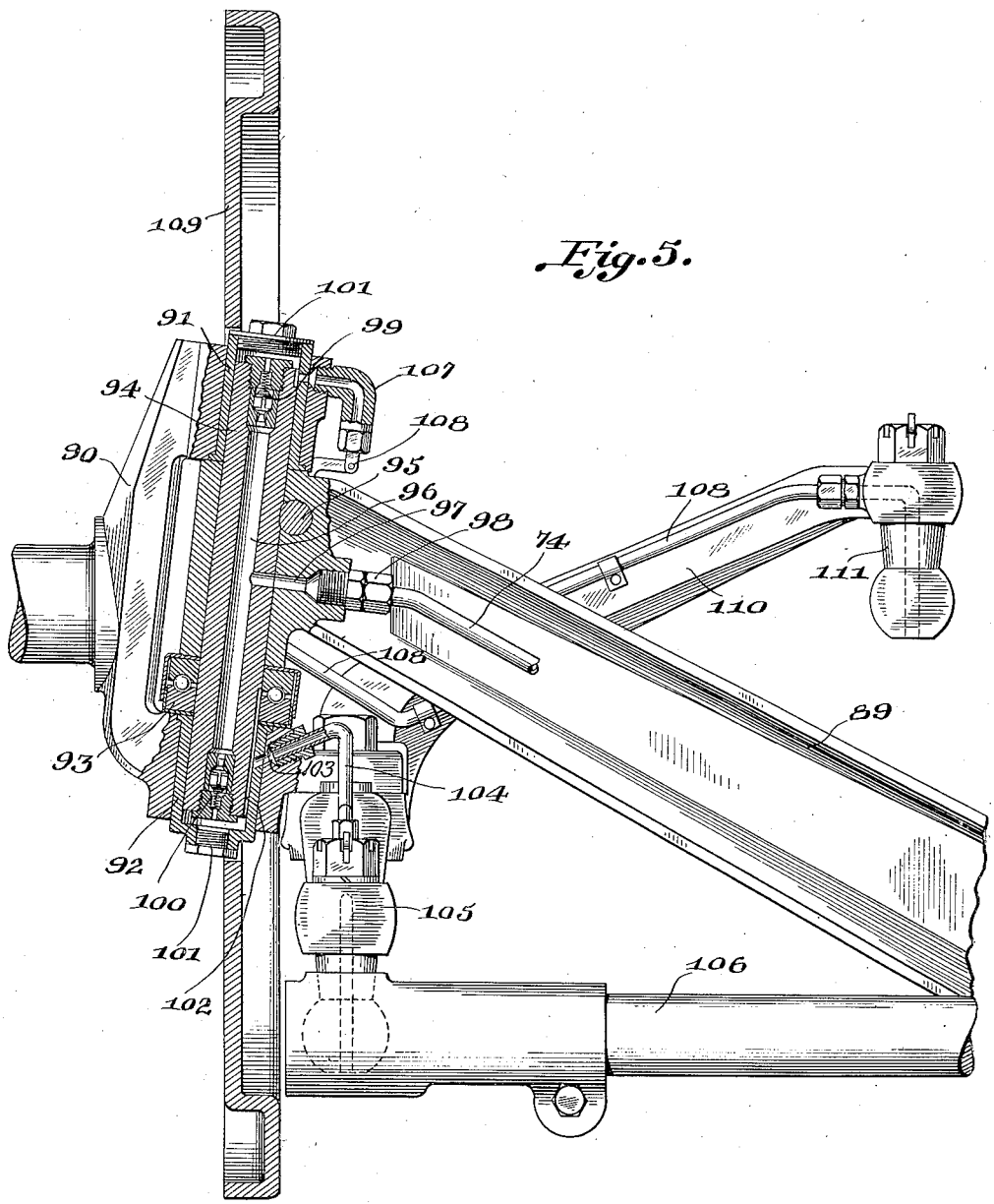
Figure 5 is a detail enlarged sectional view through a spindle of the chassis with the lubricating system applied thereto.
Figure 9:
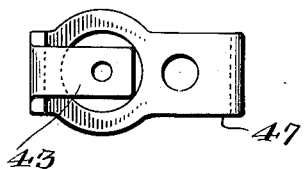
Figure 9 is a top plan view of the shiftable valve operating bracket.
Figure 10:
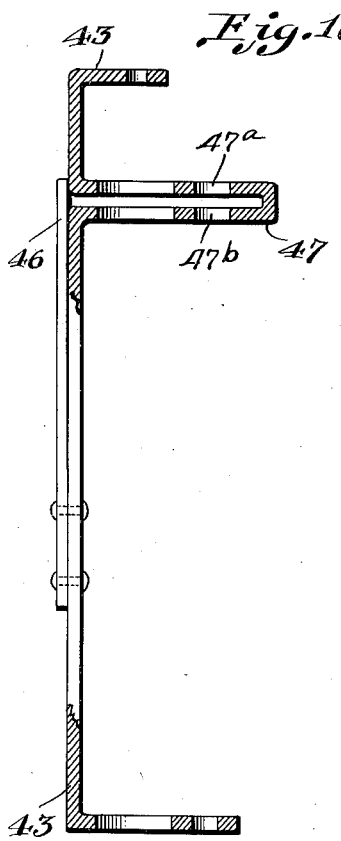
Figure 10 is a side elevation, enlarged and partly in section, of the same.
Figure 11:
Figure 11 is a detail enlarged longitudinal section through the locking dog.
Figure 12:
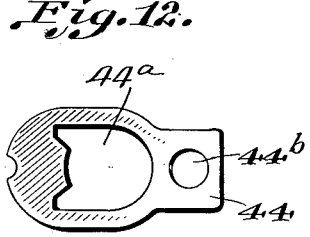
Figure 12 is a top plan view of the same.

Referring now to Figure 5 there is shown a construction of the front axle spindle mounting having the improved lubricating system applied thereto.

The numeral 89 represents the front axle on which is rotatively mounted a spindle bushing having bearings 91, 92 and 93 which are arranged to turn about the spindle pin 94 secured to the axle 89 by an anchor pin 95. The spindle pin 94 is centrally bored at 96 and transversely bored at 97 to form a communication from the central bore 96 to the stationary axle 89, the bore 97 receiving a connector 98 which secures the branch pipe 74 in place for supplying the lubricant to the central bore in the spindle pin. The spindle pin 94 is provided at opposite ends with metering or controlling valves 99 and 100 of the construction which is specifically shown in Figures 3 and 4, and above specifically described. The bearings 91 and 92 are extended beyond the opposite ends of the spindle pin 94 and are closed by screw plugs 101 which provide lubricating chambers at opposite ends of the spindle pin 94. The spindle pin 94 is provided near its lower end and at its inner side with a longitudinal lubricant groove 102 for supplying a lubricant to the bearing 93, and the spindle 90 is provided with a passage 103 which registers with the groove 102 and to which is connected a pipe 104 which leads to the bearing 105 of the tie rod 106. The spindle 90 is also provided with a tube connection 107 located at the top of the spindle 90 and opening through the upper bearing 91 to receive lubricant from the metering valve 99, the connection 107 opening into a tube 108 which is curved laterally of the axle 89 toward the disc 109 and is carried downwardly to the steering arm 110 along the latter and connected to the drag link bolt for supplying lubricant thereto.

The advantage of this construction is that the lubricant is independently fed to the lower and upper ends of the spindle pin 94 and the adjacent bearing.

The shackle lubricating means is shown in Figures 6 and 7, and it will be noted that the horn or end of the frame 112 of the chassis is bored and threaded to receive a metering or controlling valve 113 which is connected to one of the branch supply pipes 74, and which is of the same construction described and shown with reference to Figures 3 and 4. The frame 112 is bored to receive a bushing 114 which snugly fits a shackle bolt 115, the latter being centrally bored at 116 with the bore closed at its outer end and extending a substantial distance to communicate with an aperture 117 through the wall of the shackle and registering with a recess 118 on the weight carrying side of the bolt 115. The aperture 117 also registers with a port in the bushing 114 and with the metering valve 113. The central bore in the shackle bolt 115 communicates through an opening 119 in the shackle bolt with a conduit 120 which is formed in one of the shackle arms 121. The shackle bolt 122 is also bored at one end and threaded to receive a tubular member 123 communicating with the conduit 120 and with a metering valve 124, of the above described construction, which is seated in the shackle bolt 122. The shackle bolt 122 is provided intermediate its ends and beyond the metering valve 24 with a radial opening 125 which leads into a recess 126 in the outer surface of the bolt 122 for supplying lubricant thereto.

It is thus seen that the piston 29 is intermittently drawn down by suction of the intake manifold of the internal combustion engine and that the piston 29 thus maintains a predetermined pressure in the pipe 23 and all of its branches 74. As this pressure is intermittently present in all of the branch pipes, it is apparent that when lubricant is consumed in any of the bearings that the adjacent metering valve is caused to actuate and to automatically replenish the bearing with grease. The metering valves operate in conjunction with strokes of the main piston 29 because the outer springs of the metering valve are permitted to move the piston 79 rearwardly only when there is a pause in the feeding action of the pump 16, as the pressure of the pump 16 causes the metering valve to eject the measured quantity of lubricant into the bearing.

It is of course understood that various changes and modifications may be made in the details of construction and design of the above specifically described embodiment of the invention without departing from the spirit thereof, such changes and modifications are restricted only by the scope of the following claims.

What I claim is:

1. In an automatic lubricating apparatus, a container for lubricant, ejecting means for the lubricant including a piston communicating at one side with a source of suction for moving the piston in one direction, means for releasing said suction and venting said side of the piston, means for returning the piston to initial position, means for checking the return of the piston to initial position, and automatic means controllable by the pressure of the lubricant ejected from the container for controlling said checking means.

2. In an automatic lubricating apparatus, a container for lubricant, an ejecting pump mounted in the lower end of the container, a piston mounted at the intermediate portion of the container and connected to said pump, said container connected to a source of suction beneath said piston to produce the down stroke of the same, a combined suction and venting valve, shifting means for the valve connected to the piston adapted to change the position of the valves upon completion of the up and down strokes of the piston, a spring for normally urging the piston upwardly, fluid controlling means arranged in the upper part of the cylinder above the piston for checking the upward movement thereof, and an automatic pressure responsive means for the fluid controlling means connected to the pressure side of said pump for arresting the movement of said ejecting means, only when a predetermined pressure of the lubricant in the system is attained.

3. In an automatic lubricating apparatus, a cylinder, a piston mounted in the intermediate portion of the cylinder, a lubricant pump mounted in the lower end of the cylinder and about which a quantity of lubricant is adapted to be placed, said pump having an inlet at the bottom of the cylinder adapted to admit lubricant from the cylinder into the pump, controlled means in the pump for admitting the return of the lubricant from the pump to the cylinder, means for connecting the intermediate portion of the cylinder beneath said piston to enforce a suction supply for drawing said piston downwardly and actuating the pump, means operable by the piston for closing communication between the cylinder and the source of suction supply and for venting the cylinder, a spring in the lower end of the cylinder engaging said piston adapted to normally urge the same upwardly to initial position, fluid controlled means disposed in the upper end of the cylinder above the piston for regulating the return of the latter to initial position, and automatic pressure controlled means for the fluid control means and connected to the outlet of said pump for retarding the action of said piston, only after a predetermined pressure of the lubricant from said pump is attained in the system.

4. In an automatic lubricating apparatus, a container adapted to receive lubricant in the lower end thereof, a piston mounted in the intermediate portion of the container, a pump mounted in the lower end of the container and communicating at its lower end therewith to receive lubricant therefrom and operable by said piston, said pump having a controlled outlet at its upper end to the container for the return of lubricant, a spring normally holding said piston in raised position, means for connecting the intermediate portion of the cylinder with a source of suction beneath said piston for drawing the latter downwardly, means controlled upon the rise and fall of the piston for opening and closing the source of suction to the cylinder and for alternately venting the cylinder to the atmosphere, a supply pipe connected to said pump for carrying off lubricant from the cylinder under pressure, fluid controlled means at the upper end of the cylinder for checking the rise of the piston when said source of suction is closed, and pressure operated means connected to the supply pipe and to said fluid controlling means for regulating the action of the fluid against such piston and regulate the rise of the same, only when a predetermined pressure in said supply pipe is attained.

5. In an automatic lubricating apparatus, a container adapted to receive lubricant in its lower end, a pump in the lower end of the container communicating therewith for receiving the lubricant, a supply pipe leading from the pump, a small piston in the pump, a piston rod rising from said piston, a large piston in the container connected to the small piston, said small piston and piston rod having a controlled passage therethrough leading from the upper end of the pump back into the container, a spring for normally urging the pistons upwardly, means for connecting the container beneath the large piston with a source of suction for drawing the pistons downwardly, means for controlling communication between the container and the source of suction and the atmosphere, said means controlled by said piston to affect the pumping action, a liquid compartment in the upper end of the container above the large piston and having a valve controlled inlet and a relatively large opening adapted to admit of the free flow of the liquid out of and back into the compartment and against the upper side of said large piston, a flap valve in the bottom of said compartment controlling said relatively large opening, a pressure controlled means for maintaining the flap valve opened, and a branch pipe between said pressure controlled means and the supply pipe for permitting the close of said flap valve when a desired high pressure of the lubricant is reached in the supply pipe.

6. In an automatic lubricating apparatus, a container closed at its bottom and having a lubricant receiving nozzle intermediate its ends, a pump cylinder mounted in the container in the bottom thereof and having a check valve adapted to admit lubricant from the container into the cylinder, a system in the pump cylinder having a rod extending upwardly from the cylinder into the upper portion of the container, a piston in the container connected to said rod, a suction pipe rising through the bottom of the container into a position opposite said lubricant receiving nozzle connecting a source of suction to the lower end of said tube, valve means in said tube for closing the same to the source of suction and opening the lower end of the tube to the atmosphere, a bracket slidably mounted on the tube, a spring actuated locking dog carried by the bracket, said tube having spaced notches therein adapted to receive the locking dog in the upper and lower positions of said bracket, a rod carried by the piston in the container and projecting downwardly therefrom and having cam portions near its opposite ends, springs mounted on said rod, said brackets and said locking dog having apertures therein for the reception of the rod therethrough and said springs disposed at opposite sides of the bracket and the locking dog, said cam portion of the rod adapted to engage the locking dog for shifting the same out of engagement with said notches at the extreme opposite strokes of said piston in the container, means for conducting lubricant from said pump, and means for controlling the movement of said piston.

7. In an automatic lubricating apparatus, a container for lubricant, ejecting means for the lubricant including a piston, said piston subject to a pressure difference on opposite sides for moving the piston in one direction, means for equalizing pressure on opposite sides of the piston for releasing the piston, means for returning the piston to initial position, means for evacuating pressure at one side of the piston for inforcing said pressure difference on opposite sides of the piston for causing a pumping action, means for checking the return of the piston to initial position, and an automatic means controllable by the pressure of the lubricant ejected from the container for controlling said checking means.

8. In an automatic lubricating apparatus, a container for lubricant, a pump in the container for ejecting the lubricant, a supply pipe for carrying off the lubricant, and in connection with said pump and the parts to be lubricated, a piston snugly fitted to the walls of the container and coupled to said pump for actuating the same, pipe means for connecting the container to a source of energy for effecting a pressure difference on opposite sides of said piston for moving the piston in one direction, means for equalizing pressure on opposite sides of the piston for releasing the piston, means for returning the piston to initial position, and means for evacuating pressure from the container at one side of the piston for inforcing said pressure difference on opposite sides of the piston for causing a pumping action, fluid controlling means arranged in the container at the opposite side of the piston to which the evacuation of pressure is inforced for checking the return movement of the piston, and an automatic pressure responsive means for the fluid controlling means connected to the pressure side of said pump for arresting the movement of said piston, only when a predetermined pressure of the lubricant in the system is attained.

9. In an automatic lubricating apparatus, a container for lubricant, ejecting means for the lubricant including a piston communicating at one side with a source of suction for moving the piston in one direction, valve means for releasing said suction, a vent aperture controlled by said valve means for ventilating the said suction side of the piston, when said suction communication is closed, means for returning the piston to initial position, said valve means adapted to close said vent aperture and to register said suction communication to the said one side of the piston upon the return of the piston to its initial position in order to effect a pumping action, fluid controlled means disposed at the opposite side of the piston to which the suction communication is inforced, for regulating the return of the piston to initial position, and an automatic pressure responsive means for the fluid controlled means connected to the outlet of said ejecting means for retarding the action of said ejecting means, only after a predetermined pressure of the lubricant ejected from said ejecting means is attained in the system.

ERNEST J. SERPAS.